F. T. KITCHEN.
CONTROLLER FOR HEATING SYSTEMS.
APPLICATION FILED JUNE 7, 1913.
1,121,635.
Patented Dec. 22, 1914.
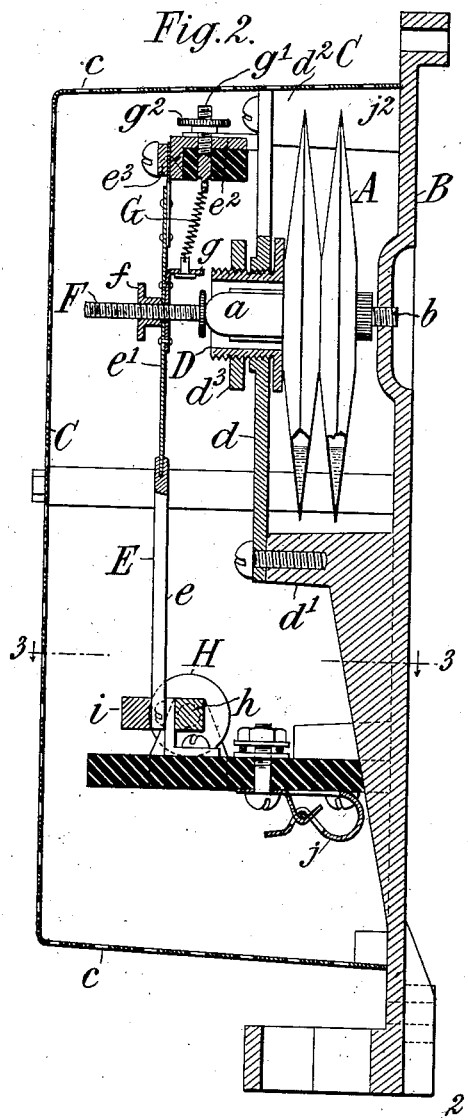
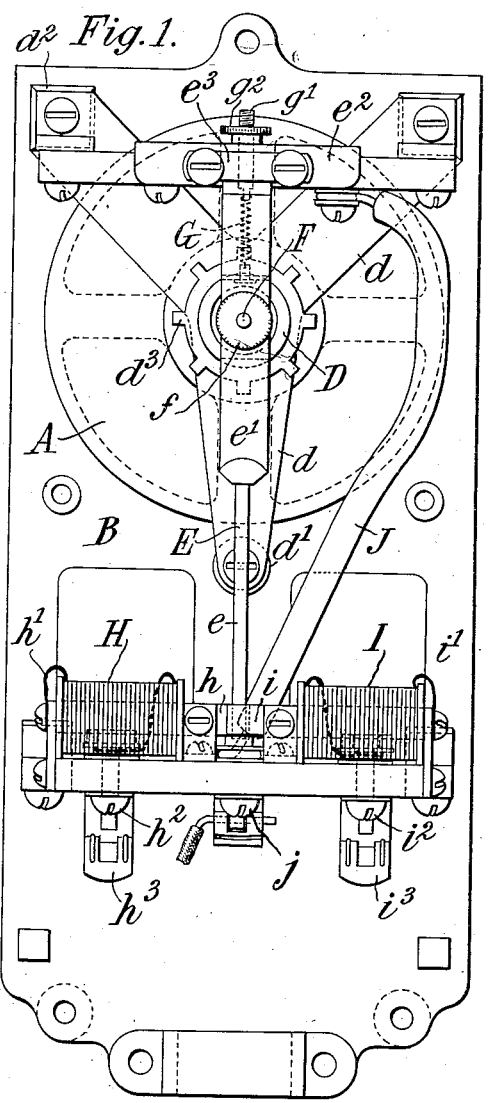
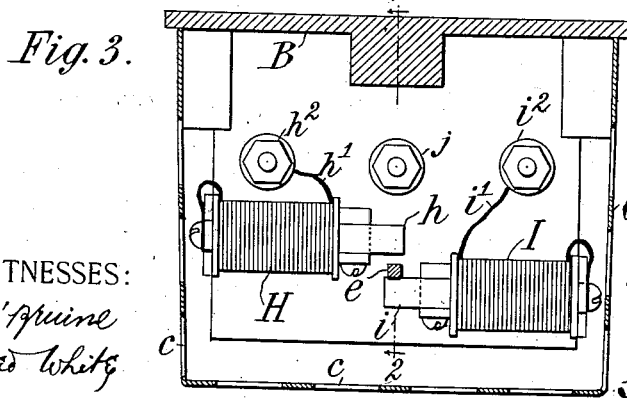
WITNESSES:
INVENTOR:
Frederick T. Kitchen,
By Attorneys,

//# UNITED STATES PATENT OFFICE.

FREDERICK T. KITCHEN, OF WEST NEW BRIGHTON, NEW YORK, ASSIGNOR TO GOLD CAR HEATING & LIGHTING COMPANY, OF NEW YORK, N. Y., A CORPORATION OF NEW YORK.

CONTROLLER FOR HEATING SYSTEMS.

1,121,635.  Specification of Letters Patent.  Patented Dec. 22, 1914.

Application filed June 7, 1913. Serial No. 772,351.

*To all whom it may concern:*

Be it known that I, FREDERICK T. KITCHEN, a citizen of the United States, residing in West New Brighton, Richmond county, and State of New York, have invented certain new and useful Improvements in Controllers for Heating Systems, of which the following is a specification.

My invention relates to a device for automatically controlling the supply of heating fluid to a heating system and is applicable for use with various kinds of heating systems, steam, electric, etc. It may be used in such systems in heating houses and also in railway passenger cars and has properties which make it particularly desirable for the latter use.

My invention provides means whereby a thermostat is caused to operate an electric switch which is located in a circuit which includes means for controlling the supply of heating fluid.

A desirable form in which the invention may be embodied is illustrated in the accompanying drawing, wherein—

Figure 1 is a plan view of my improved controller with the casing or cover removed; Fig. 2 is a longitudinal section on the line 2—2, Fig. 3; Fig. 3 is a cross section on the line 3—3, Fig. 2, looking in the direction of the arrows.

In accordance with my invention the supply of heating fluid to the room, railway car or other apartment to be heated is controlled by the temperature of the said apartment whereby as the said temperature drops the supply of heating fluid is automatically increased and as it rises the supply of heating fluid is decreased or shut off. Therefore I provide means for operating my controlling device consisting of a thermostat and the said thermostat may be of any desired variety of which many are known. Preferably I employ an expansible vessel A which is double as illustrated, to wit, it contains two vessels which are joined at their centers so that they shall open one into the other and which vessels contain a small amount of volatile fluid. I employ a fluid for this purpose that is exceedingly sensitive and will readily expand or contract upon a slight change in the temperature of the surrounding atmosphere and will thereby operate the apparatus within a small range. Such fluids are known and form no part of my present invention.

The expansible vessel A is mounted upon a back plate B which is perforated for attachment to the wall etc. and is provided with a removable cover C which is ventilated through numerous perforations $c$ whereby the surrounding atmosphere is freely admitted to render the expansible vessel A sensitive in its action. The expansible vessel A is illustrated as being supported upon the back plate B by a bolt $b$ which is attached thereto. Means are provided to limit the play of the expansible vessel A, to prevent the same being strained, comprising a hollow sleeve D which is threaded in a spider $d$ supported upon posts $d^1$; $d^2$ attached to the back plate B. A lock nut $d^3$ secures the stop D in position to which it may be adjusted.

A switch member E is preferably provided with a soft iron part $e$ and with a spring part $e^1$, the latter of which is supported upon a block $e^2$ suitably attached to the post $d^2$ and is held in place by a bridge $e^3$ which is screwed to the said block. The switch member E is moved outward by the expansion of the expansible vessel A and a post $a$ attached to A is provided for the purpose of transmitting the motion of the expansible vessel to the switch. Means are likewise provided, whereby the extent of movement transmitted to the switch through the expansible vessel A may be varied, consisting of the stop-bolt F which is threaded in the switch member E and is adjusted in position by a thumb nut $f$. The threaded sleeve D not only constitutes a stop for restraining the movement of the expansible vessel A within the limits to which the said sleeve may be adjusted, but likewise constitutes means whereby the expansible vessel A is prevented from straining the switch member E. The stop F constitutes means whereby the range of temperatures, within which the expansible vessel A will actuate the switch member E may be varied. For instance, by adjusting the stop F farther away from the thermostat A and permitting the said thermostat A to have increased movement, the said thermostat A will actuate the switch member E at a higher temperature than before. Means are provided to retract the switch member E and such means preferably consist of a spring G which as illustrated is a helical spring suitably attached to a projection $g$ from the switch member E and to the block $e^2$. Connection of the said spring to the said block is through a threaded bolt $g^1$ and lock nut $g^2$ whereby the tension upon the spring G may be adjusted. The spring G and its adjustable character are important in that said spring controls the operation of the switch.

The forward or free end $e$ of the switch member E constitutes an armature for the electro-magnets H, I. Cores $h$, $i$ are located in position in contact with the said armature $e$ as the same is moved toward one or the other. The said cores $h$, $i$ are preferably formed of permanent magnets for a purpose presently to be described. The switch member E is adapted to form part of an electric circuit and communicates with a source of electricity through the block $e^2$, and wire J which is connected to binding post $j$ which receives the leading-in wire. Cores $h$, $i$ are in electric connection with the coils of their respective magnets while wires $h^1$, $i^1$ at the other end of the said coils are connected to binding posts $h^2$, $i^2$ which are in electric connection with wire-receiving sockets $h^3$, $i^3$.

In operation my improved temperature controlling device will preferably be included in an electric circuit which includes a magnetically operated electric switch, if the heating system to be controlled is an electric heating system, or a steam valve, if it is a steam heating system or other device for controlling the flow of heating fluid. Preferably the controlling circuit will also include a magnetic switch which after the circuit has been closed will automatically break the controller circuit without effecting the heating circuit which will then remain in adjusted condition until the controller makes contact with the other magnet, whereupon the condition of the heating fluid controlling device will be changed. Such means, to wit, the said switch, form no part of my invention and are referred to merely to illustrate a possible use of my improved controlling device. I may well employ the said controlling device in connection with an apparatus of the character above referred to which is described in the application of Charles B. McLeer, filed September 23, 1913, Serial No. 791,327.

The operation of my temperature controlling device is as follows: Assume that the heating fluid has been turned on whereupon the temperature in the apartment has risen to a point where it is desired that the same should be turned off. Accordingly the stops D, F and spring G having been properly adjusted will cause the expansible vessel A to press the switch member E outward flexing the spring $e^1$ slightly and finally causing the same to make a quick break from the permanent magnet core $h$ and to pass into contact with the core $i$ of the magnet I. The electric current is then caused to pass through the wire J, block $e^2$, switch E, core $i$ magnet I, binding post $i^2$ through a wire not shown which is attached to the connection $i^3$ whereby means are operated which are not illustrated but which shut off the supply of heating fluid. Included in this circuit preferably is a magnetic switch which I have not shown as it forms no part of my invention but which operates after a short space of time to break the controller circuit. The armature bar $e$ of the switch E, however, still remains in contact with the permanent magnet $i$ and will so remain until the apartment to be heated has sufficiently cooled to contract the expansible vessel A. Thereupon the spring G will pull the switch member E away from the contact $i$ and into contact with the core $h$. Thereupon the electric current will flow through the wire J, block $e^2$, switch E, core $h$, magnet H, binding post $h^2$ to a wire which is not shown but which is attached to connection $h^3$, thereby closing the circuit which includes means for turning on the supply of heating fluid. The supply of heating fluid once turned on will remain turned on until closed by the controlling device although the controller circuit will shortly be broken by the magnetic switch above referred to, but the switch member E will remain in contact with the core $h$, by reason of the fact that the latter is a permanent magnet, until the switch E is again operated by the expansible vessel A.

The employment of the magnets H, I has the advantage of securing a quick adhesion of the switch member E and causes a firm contact between the contact points $e$, $i$—$e$, $h$ whereby chattering is prevented and this has a decided advantage in the employment of the controlling device herein described in connection with a car heating system. The employment of permanent magnets as the cores $i$, $h$ has likewise the effect of restraining the switch member E and preventing the same from chattering and in making under the impulse of the retracting spring G and in connection with the spring $e^1$ a quick break with the core from which the switch is being drawn and an equally quick contact with the opposite core.

I have illustrated the employment of two magnets H, I which control means whereby the supply of heating fluid is respectively turned on and turned off. Obviously my invention does not necessitate the employment of two magnets and would be equally present in a structure conforming to the appended claims, wherein the number of magnets is varied from that shown. These and other modifications within the limits of the appended claims are within my invention.

What I claim is:—

1. An automatic controlling device for heating systems, comprising a thermostat controlled by the temperature of the surrounding atmosphere, a movable magnetic spring switch member adapted to be actuated by said thermostat and forming part of an electric circuit, an electro-magnet and a permanently magnetized core therefor adapted to form a contact for said switch member and adapted to be included in said circuit, and means tending to withdraw said switch member from contact with said core.

2. An automatic controlling device for heating systems, comprising an expansible vessel having a volatile fluid therein and controlled by the temperature of the surrounding atmosphere, and rigidly held upon a frame, a stop for limiting the expansion thereof adjustable with relation to said expansible vessel, a magnetic spring switch member adapted to be moved by said thermostat, and an adjustable connection between said switch and said thermostat for regulating the extent of movement communicated to the switch member by the thermostat, a retracting spring for said switch member, a pair of magnets having their cores in position to make contact with said switch member as it is moved whereby one or the other of said magnets is placed in circuit.

3. An automatic controlling device for heating systems, comprising a sealed double expansible vessel containing volatile fluid and controlled by the temperature of the surrounding atmosphere and secured in position against accidental movement, a stop for limiting the expansion thereof, adjustable with relation to said expansible vessel, a magnetic spring switch member adapted to be moved by the expansion of said thermostat, an adjustable connection between said switch and said thermostat, a retracting spring for said switch, and a magnetic contact for said switch.

4. An automatic controlling device for heating systems, comprising a sealed double expansible vessel containing volatile fluid and controlled by the temperature of the surrounding atmosphere, and secured in position against accidental movement, a stop for limiting the expansion thereof adjustable with relation to said expansible vessel, a magnetic spring switch member adapted to be moved by the expansion of said thermostat, an adjustable connection between said switch and said thermostat, a retracting spring for said switch, a pair of magnets having permanently magnetized cores adapted to serve as the respective contacts for said switch.

5. An automatic controlling device for heating systems, comprising a resilient switch member forming part of an electric circuit and having its free end adapted to engage one or the other of two terminals, a pair of electro magnets, included in said circuit and having their cores forming said terminals, and thermostatic means controlled by the temperature in the apartment for moving said switch, and a retracting spring for said switch, said electro magnetic cores being permanently magnetized, whereby said switch presents a resistance to breaking contact with either of said terminals and when moved by its spring makes a quick break.

6. An automatic controlling device for heating systems, comprising a thermostat controlled by the temperature of the surrounding atmosphere, a switch member adapted to be moved by said thermostat to open or close an electric circuit, a stop for limiting the movement of said thermostat adjustably mounted in a fixed part of a frame, and an operating connection between said thermostat and switch, adjustable to vary the temperature at which the switch is moved by the thermostat.

7. An automatic controlling device for heating systems, comprising a thermostat consisting of an expansible vessel having a volatile fluid therein and controlled by the temperature of the surrounding atmosphere, a switch member, adapted to be moved by said thermostat to open or close an electric circuit, a stop for limiting the movement of said thermostat adjustably mounted in a fixed part of a frame, and an operating connection between said thermostat and switch, adjustable to vary the temperature at which the switch is moved by the thermostat, a casing for said device perforated to permit free access of the atmospheric air surrounding said device to said thermostat whereby the same is rendered sensitive in action.

In witness whereof I have hereunto signed my name in the presence of two subscribing witnesses.

FREDERICK T. KITCHEN.

Witnesses:
 HENRY M. TURK,
 FRED WHITE.